United States Patent
Harrison et al.

(10) Patent No.: US 8,331,478 B2
(45) Date of Patent: Dec. 11, 2012

(54) TRANSMIT DIVERSITY USING LOW CODE RATE SPATIAL MULTIPLEXING

(75) Inventors: Robert Mark Harrison, Irving, TX (US); Hua Xu, Kanata (CA); Andrew Mark Earnshaw, Kanata (CA); Zhijun Cai, Irving, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 265 days.

(21) Appl. No.: 12/684,817

(22) Filed: Jan. 8, 2010

(65) Prior Publication Data

US 2011/0170575 A1  Jul. 14, 2011

(51) Int. Cl.
*H04B 7/02* (2006.01)

(52) U.S. Cl. ........ 375/267; 375/141; 375/146; 375/219; 375/220; 375/260; 375/295; 375/299; 455/39; 455/73; 455/91; 455/101; 455/132; 455/296; 455/500; 455/562.1; 370/272; 370/273; 370/276; 370/297; 370/334; 370/464; 370/480; 341/173; 341/180

(58) Field of Classification Search ........... 375/141, 375/146, 219, 220, 260, 267, 295, 299; 455/39, 455/73, 91, 101, 132, 296, 500, 562.1; 370/272, 370/273, 276, 297, 334, 464, 480; 341/173, 341/180
See application file for complete search history.

(56) References Cited

U.S. PATENT DOCUMENTS

| 2006/0045169 | A1* | 3/2006 | Kim | 375/144 |
| 2010/0202559 | A1* | 8/2010 | Luo et al. | 375/295 |

OTHER PUBLICATIONS

3GPP TS 36.211 V8.8.0; 3rd Generation Partnership Project; Technical Specification Group Radio Access Network; Evolved Universal Terrestrial Radio Access (E-UTRA); Physical Channels and Modulation; Release 8; Sep. 2009; 83 pgs.
3GPP TS 36.212 V8.7.0; 3rd Generation Partnership Project; Technical Specification Group Radio Access Network; Evolved Universal Terrestrial Radio Access (E-UTRA); Multiplexing and Channel Coding; Release 8; May 2009; 60 pgs.
3GPP TS 36.213 V8.8.0; 3rd Generation Partnership Project; Technical Specification Group Radio Access Network; Evolved Universal Terrestrial Radio Access (E-UTRA); Physical Layer Procedures; Release 8; Sep. 2009; 77 pgs.
3GPP TR 36.814 V1.5.0; 3rd Generation Partnership Project; Technical Specification Group Radio Access Network; Further Advancements for E-UTRA Physical Layer Aspects; Release 9; Nov. 2009; 53 pgs.

(Continued)

*Primary Examiner* — Leon Flores
(74) *Attorney, Agent, or Firm* — Conley Rose, P.C.; J. Robert Brown, Jr.

(57) ABSTRACT

A system is provided for transmitting a low code rate spatially multiplexed channel on multiple antennas. The system includes a transmitter and a processor. The processor is configured such that the processor encodes a block of information bits to form channel coded bits, wherein the ratio of the number of channel coded bits to the number of information bits is greater than one; and the processor maps the channel coded bits to modulation symbols, and each channel coded bit is mapped once to a modulation symbol. The transmitter is configured to transmit a first portion of the modulation symbols using a spreading sequence on a first antenna of the multiple antennas and to transmit a second portion of the modulation symbols using the spreading sequence on a second antenna of the multiple antennas.

30 Claims, 18 Drawing Sheets

OTHER PUBLICATIONS

3GPP TSG-RAN WG1 #52bis; Agenda Item 6.2; Discussion and Decision; On the Bit Ordering and Decoding Complexity of Subset Coding; Ericsson, Motorola, Qualcomm, Broadcom, LGE, ITRI, Samsung; R1-081611; Shenzhen, China; Mar. 31-Apr. 4, 2008; 2 pages.

3GPP TSG RAN WG1 #57; Agenda Item 15.5; Discussion and Decision; Performances of UL Multiple Antenna Transmission for PUCCH; Huawei; R1-091816; San Francisco, USA; May 4-8, 2009; 7 pages.

3GPP TSG-RAN WG1 #57; Agenda Item 15.5; Discussion/Decision; Evaluation of Transmit Diversity for PUCCH in LTE-A; Nortel; R1-091925; San Francisco, US; May 4-8, 2009; 10 pages.

3GPP TSG-RAN WG1 #57; Agenda Item 15.5; Discussion and Decision; PUCCH Transmit Diversity; Qualcomm Europe; R1-092065; San Francisco, USA; May 4-8, 2009; 8 pages.

3GPP TSG-RAN Working Group 1 Meeting #5; Proposal; Harmonization Impact on TFCI and New Optimal Coding for Extended TFCI with Almost no Complexity Increase; Samsung; TSGR(99)913; Helsinki, Filand; Jul. 13-16, 1999; 9 pages.

Alamouti, Siavash M., "A Simple Transmit Diversity Technique for Wireless Communications," IEEE Journal on Select Areas in Communications, vol. 16, No. 8, Oct. 1998, pp. 1451-1458.

Khan, Farooq, "LTE for 4G Mobile Broadband: Air Interface Technologies and Performance," Cambridge University Press, 2009, 11 pages.

* cited by examiner

\* This RS carries ACK/NACK in formats 2a and 2b $$H \equiv \begin{bmatrix} F & G_{12} \\ G_{21} & G_{22} \end{bmatrix} \equiv \begin{bmatrix} f_{1,1} & f_{1,2} & \cdots & f_{1,11} & g_{1,12} & g_{1,13} \\ f_{2,1} & f_{2,2} & \cdots & f_{2,11} & g_{2,12} & g_{2,13} \\ \vdots & \vdots & \ddots & \vdots & \vdots & \vdots \\ f_{32,1} & f_{32,2} & \cdots & f_{32,11} & g_{32,12} & g_{32,13} \\ g_{33,1} & g_{33,2} & \cdots & g_{32,11} & g_{33,12} & g_{33,13} \\ \vdots & \vdots & \ddots & \vdots & \vdots & \vdots \\ g_{40,1} & g_{40,2} & \cdots & g_{40,11} & g_{40,12} & g_{40,13} \end{bmatrix}$$

Figure 12a $$G_{12} \equiv \begin{bmatrix} f_{3,11} & f_{4,11} & \cdots & f_{30,11} & f_{31,11} & f_{32,11} & f_{1,11} & f_{2,11} \\ f_{9,11} & f_{10,11} & \cdots & f_{32,11} & f_{1,11} & f_{2,11} & \cdots & f_{8,11} \end{bmatrix}^T$$

Figure 12b $$H_{12} \equiv \begin{bmatrix} F & G_{12} \end{bmatrix}$$

Figure 12c $$H = \begin{bmatrix} H_{12} \\ SH_{12}(1:8,:) \end{bmatrix} \ ; \ S \equiv \begin{bmatrix} s_1 & 0 & 0 & 0 \\ 0 & s_2 & 0 & 0 \\ 0 & 0 & \ddots & \vdots \\ 0 & 0 & \cdots & s_8 \end{bmatrix}$$

Figure 12d $$H = \begin{bmatrix} H_{12} \\ S[Z_5 & E_6 & M_1 & O_1] \end{bmatrix}$$

Figure 12e

| | Information Bit # | | | | | | | | | | | Channel Bit # | Information Bit # | | | | | | | | | | |
|---|---|---|---|---|---|---|---|---|---|---|---|---|---|---|---|---|---|---|---|---|---|---|---|
| Channel Bit # | 0 | 1 | 2 | 3 | 4 | 5 | 6 | 7 | 8 | 9 | 10 | | 0 | 1 | 2 | 3 | 4 | 5 | 6 | 7 | 8 | 9 | 10 |
| 0 | 1 | 0 | 0 | 0 | 0 | 0 | 0 | 0 | 0 | 0 | 0 | 16 | 1 | 1 | 0 | 0 | 0 | 0 | 0 | 0 | 0 | 0 | 1 |
| 1 | 1 | 0 | 0 | 0 | 0 | 1 | 1 | 0 | 0 | 0 | 0 | 17 | 1 | 1 | 0 | 0 | 0 | 1 | 1 | 1 | 0 | 0 | 1 |
| 2 | 1 | 0 | 0 | 0 | 1 | 0 | 0 | 1 | 1 | 0 | 1 | 18 | 1 | 1 | 0 | 0 | 1 | 0 | 1 | 1 | 1 | 0 | 1 |
| 3 | 1 | 0 | 0 | 0 | 1 | 1 | 0 | 1 | 0 | 0 | 1 | 19 | 1 | 1 | 0 | 0 | 1 | 1 | 1 | 1 | 0 | 1 | 1 |
| 4 | 1 | 0 | 0 | 1 | 0 | 0 | 1 | 0 | 1 | 1 | 1 | 20 | 1 | 1 | 0 | 1 | 0 | 0 | 0 | 0 | 0 | 1 | 1 |
| 5 | 1 | 0 | 0 | 1 | 0 | 1 | 0 | 1 | 1 | 1 | 1 | 21 | 1 | 1 | 0 | 1 | 0 | 1 | 0 | 1 | 0 | 1 | 1 |
| 6 | 1 | 0 | 0 | 1 | 1 | 0 | 0 | 1 | 1 | 0 | 1 | 22 | 1 | 1 | 0 | 1 | 1 | 0 | 0 | 1 | 0 | 1 | 1 |
| 7 | 1 | 0 | 0 | 1 | 1 | 1 | 0 | 0 | 1 | 0 | 0 | 23 | 1 | 1 | 0 | 1 | 1 | 1 | 1 | 0 | 0 | 0 | 0 |
| 8 | 1 | 0 | 1 | 0 | 0 | 0 | 1 | 0 | 0 | 0 | 1 | 24 | 1 | 1 | 1 | 0 | 0 | 0 | 0 | 0 | 0 | 1 | 1 |
| 9 | 1 | 0 | 1 | 0 | 0 | 1 | 1 | 1 | 0 | 1 | 1 | 25 | 1 | 1 | 1 | 0 | 0 | 1 | 1 | 0 | 1 | 0 | 1 |
| 10 | 1 | 0 | 1 | 0 | 1 | 0 | 1 | 0 | 1 | 1 | 1 | 26 | 1 | 1 | 1 | 0 | 1 | 0 | 0 | 0 | 1 | 1 | 1 |
| 11 | 1 | 0 | 1 | 0 | 1 | 1 | 1 | 0 | 1 | 0 | 0 | 27 | 1 | 1 | 1 | 0 | 1 | 1 | 1 | 0 | 0 | 1 | 0 |
| 12 | 1 | 0 | 1 | 1 | 0 | 0 | 0 | 0 | 1 | 0 | 1 | 28 | 1 | 1 | 1 | 1 | 0 | 0 | 0 | 1 | 0 | 0 | 1 |
| 13 | 1 | 0 | 1 | 1 | 0 | 1 | 0 | 0 | 1 | 1 | 0 | 29 | 1 | 1 | 1 | 1 | 0 | 1 | 0 | 1 | 1 | 1 | 0 |
| 14 | 1 | 0 | 1 | 1 | 1 | 0 | 1 | 0 | 0 | 1 | 1 | 30 | 1 | 1 | 1 | 1 | 1 | 0 | 1 | 1 | 1 | 1 | 0 |
| 15 | 1 | 0 | 1 | 1 | 1 | 1 | 1 | 1 | 1 | 0 | 0 | 31 | 1 | 1 | 1 | 1 | 1 | 1 | 1 | 1 | 1 | 1 | 1 |

1310

Table 1: The Reordered F Matrix

1320

| | User | | | | | | | | |
|---|---|---|---|---|---|---|---|---|---|
| Slot | 1 | 2 | 3 | 4 | 5 | 6 | 7 | 8 | 9 |
| 1330 — 1 | 1,10 | 2,11 | 3,12 | 4 | 5 | 6 | 7 | 8 | 9 |
| 1340 — 2 | 1 | 2 | 3 | 4,10 | 5,11 | 6,12 | 7 | 8 | 9 |

Table 2: Orthogonal Resource Usage for Variable Orthogonality per Slot

1350

| | User | | | | | |
|---|---|---|---|---|---|---|
| Slot | 1 | 2 | 3 | 4 | 5 | 6 |
| 1 | 1,10 | 2,11 | 3,12 | 4,7 | 5,8 | 6,9 |
| 2 | 1,10 | 2,11 | 3,12 | 4,7 | 5,8 | 6,9 |

Table 3: Orthogonal Resource Usage for Fixed Orthogonality per Slot with 2 Resources

Figure 13

$$\begin{bmatrix} d_0 \\ \vdots \\ d_7 \\ d_8 \\ \vdots \\ d_{31} \end{bmatrix} = \mathbf{G} \left[ \mathbf{c}_2(\hat{\mathbf{b}}_2) \circ \begin{bmatrix} [h_{32}/2]^* \\ \vdots \\ h_{39}/2 \\ 0 \\ \vdots \\ 0 \end{bmatrix} \circ \begin{bmatrix} s_0 \\ \vdots \\ s_7 \\ 0 \\ \vdots \\ 0 \end{bmatrix} \circ \begin{bmatrix} r_{32} \\ \vdots \\ r_{39} \\ 0 \\ \vdots \\ 0 \end{bmatrix} + \begin{bmatrix} [h_0/2]^* \\ \vdots \\ h_7/2 \\ h_8 \\ \vdots \\ h_{31} \end{bmatrix} \circ \begin{bmatrix} r_0 \\ \vdots \\ r_7 \\ r_8 \\ \vdots \\ r_{31} \end{bmatrix} \right]$$

- Hadamard Matrix
- Mask
- Repeated Portion
- Non-Repeated Portion
- BPSK-Mapped Spreading Sequence

Figure 14

$$\delta = \mathbf{s}^T \left( \begin{bmatrix} h_{32} \\ \vdots \\ h_{39} \end{bmatrix}^* \circ \begin{bmatrix} c_2(\hat{b}_{2,32}) \\ \vdots \\ c_2(\hat{b}_{2,39}) \end{bmatrix} \circ \begin{bmatrix} r_{32} \\ \vdots \\ r_{39} \end{bmatrix} \right) \qquad d_i = \begin{cases} d_i + \delta; & i \text{ has odd Hamming weight} \\ d_i - \delta; & i \text{ has even Hamming weight} \end{cases}$$

Figure 15

TRANSMIT DIVERSITY USING LOW CODE RATE SPATIAL MULTIPLEXING

BACKGROUND

As used herein, the terms "user equipment" and "UE" can refer to wireless devices such as mobile telephones, personal digital assistants, handheld or laptop computers, and similar devices that have telecommunications capabilities. Such a UE might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UE" may also refer to devices that have similar wireless capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long Term Evolution (LTE) and LTE-Advanced (LTE-A). For example, an LTE or LTE-A system might include an evolved Node B (eNB), a wireless access point, or a similar component rather than a traditional base station. As used herein, the terms "eNB" or "access node" will refer to any component of a wireless network, such as a traditional base station, a wireless access point, or an LTE or LTE-A eNB, that creates a geographical area of reception and transmission coverage allowing a UE or a relay node to access other components in a telecommunications system. An access node may comprise a plurality of hardware and software.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 12a-12e depict equations that may be used in low code rate spatial multiplexing, according to an embodiment of the disclosure.

FIG. 13 depicts tables that may be used in low code rate spatial multiplexing, according to an embodiment of the disclosure.

FIG. 14 is a diagram of a receiver structure for a repeat-and-spread extended Reed-Muller code, according to an embodiment of the disclosure.

FIG. 15 is a diagram of a receiver structure for a low-rank extended Reed-Muller code, according to an embodiment of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Multi-antenna UE transmission is a key component of the current LTE-A work in the Third Generation Partnership Project (3GPP). The present disclosure provides a flexible transmit diversity technique suitable for use on the LTE-A physical uplink control channel (PUCCH) that avoids drawbacks of existing techniques proposed for the PUCCH, that can use channel coding that is backward compatible with existing LTE PUCCH codes, and that provides performance comparable to techniques that use twice as many orthogonal resources (and therefore allow half as many users to share the same total PUCCH resources).

Two general approaches have been developed for multi-antenna transmission: transmit diversity and spatial multiplexing. These two techniques are normally thought of as mutually exclusive, with transmit diversity being used to improve robustness in poorer channel conditions and spatial multiplexing being used to improve throughput in better channel conditions.

Figure 1:
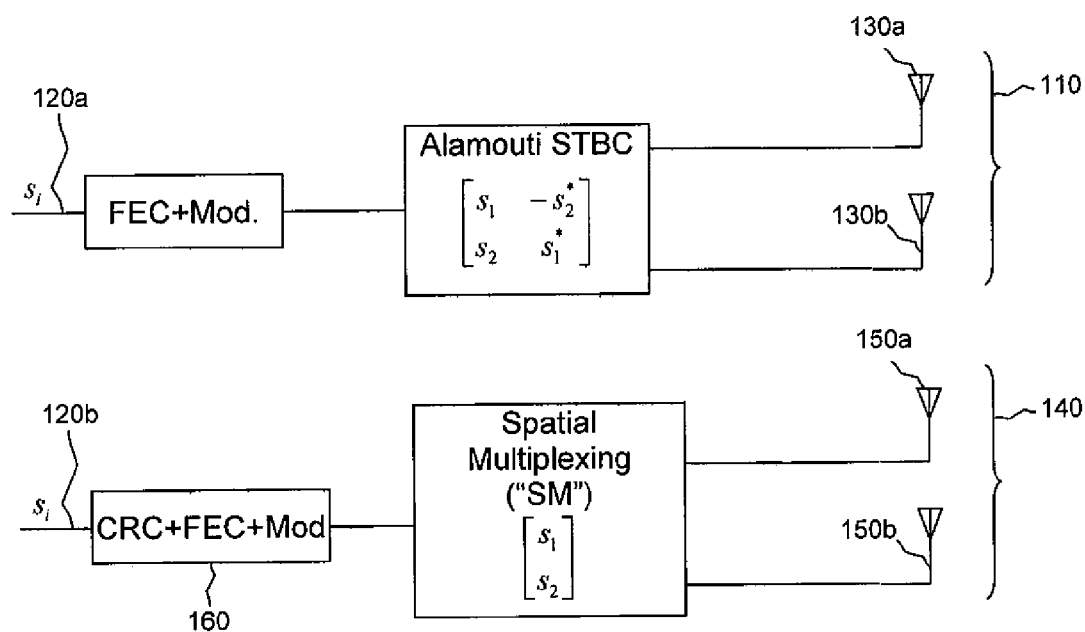
FIG. 1 is a diagram of multi-antenna transmission approaches, according to the prior art.

The top portion 110 of FIG. 1 shows a commonly used space time block code (STBC), the "Alamouti" code, that can be used for transmit diversity. A forward error correction (FEC) code is typically used, and then the coded symbols are modulated to form a symbol stream, 's' 120. These symbols are taken two at a time, and then the first symbol is transmitted on a first antenna 130a at a first time, while at the same time the second symbol is transmitted on a second antenna 130b. At a second time instant, the second symbol is negated and conjugated and transmitted on the first antenna 130a, while at the same time the first symbol is conjugated and transmitted on the second antenna 130b. Because the symbols are transmitted simultaneously on the two antennas 130, but also are transmitted over two time slots, the number of symbols transmitted on the antennas 130 is the same as the number of symbols produced by the modulation and coding (that is, this is a "rate one STBC"). Due to the properties of the STBC, a receiver can recover the two transmitted symbols such that the power from the two antennas 130 combines efficiently, and excellent diversity gain is achieved. This diversity gain reduces the chance of an erroneous reception, improving performance under difficult channel conditions. However, unlike spatial multiplexing, it does not increase the number of symbols that can be transmitted on a channel.

The bottom part 140 of FIG. 1 shows a simple spatial multiplexing approach. Here, a cyclic redundancy check (CRC) code is used along with FEC and modulation. The modulated symbols are then simply split between the two antennas 150 and transmitted simultaneously on both antennas 150. If there is sufficient scattering in the radio propagation and a sufficiently high signal-to-noise ratio (SNR), a receiving device (not shown) with two antennas will have independent measurements of the combined symbols, and can separate them and successfully decode the transmission. Here, the number of symbols per antenna 150 is half the number of symbols out of the CRC+FEC+Mod block 160. This allows the information data rate in the same bandwidth to be doubled.

Because spatial multiplexing requires relatively high SNR and sufficient scattering, it is not as robust as other transmission techniques. This lack of robustness means that it tends to be operated at relatively high block error rates (at least for initial transmissions). Since data transmission systems ultimately require low error rates, additional mechanisms such as hybrid automatic repeat request (HARQ) are used to lower the error rate. These mechanisms require some error detection means to determine if a block was in error, so that a retransmission can be requested and/or the transmission can be combined with a subsequent transmission. The most commonly used error detection means is additional parity bits (often using a CRC code) computed on the data and then encoded in the FEC.

The additional transmit diversity gain from using more than two antennas over that of two antennas diminishes with increasing diversity from other sources such as more receive antennas, frequency diversity from multipath, time diversity from HARQ or interleaving, etc. However, if a UE has more than two transmit antennas, it still can be important to transmit on all the antennas in order to make the most efficient use of the UE's power amplifiers. Therefore, schemes that extend two antenna transmit diversity to more antennas are of interest.

Figure 2:
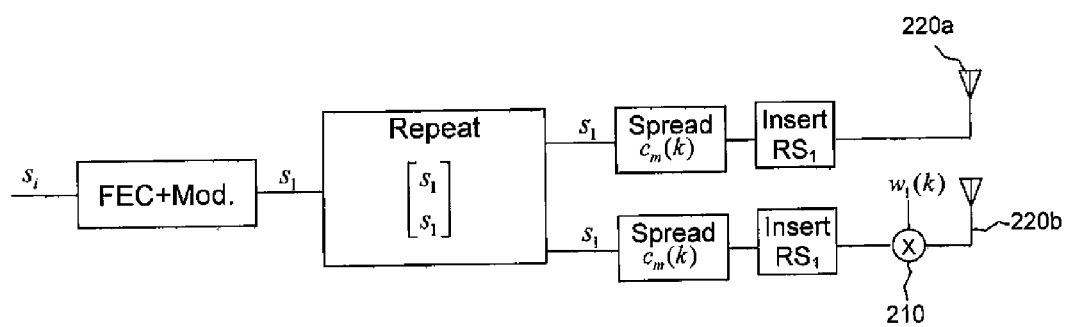
FIG. 2 is a diagram of antenna virtualization, according to the prior art.

One simple way to extend transmit diversity is to use antenna virtualization. This is shown in FIG. 2. Antenna virtualization can be defined as transmitting on multiple antennas in such a way that they appear as a single antenna from the receiver's perspective. A virtualized antenna may be defined as one of a set of antennas that transmit together and appear as a single antenna. A virtual antenna may be defined as the set of antennas that appear as a single antenna. If coherent demodulation is used, this typically requires that a single reference signal (labeled in the figure as $RS_1$) be used as a phase reference for physical channels transmitted through the virtualized antennas. It also requires that if spreading is used (for example with the sequence $c_m(k)$ in the figure) that one common spreading sequence is used on all the virtualized antennas. In this way, the modulated symbols and reference signal are received with the same composite channel response, and the reference signal can be used as a phase reference for the modulated symbols.

FIG. 2 also uses a complex weight sequence $w_1(k)$ 210 on the second 220b of the virtualized antennas 220. The weight sequence 210 can be applied in time and/or frequency, such that it varies by subcarrier and/or by orthogonal frequency division multiplexing (OFDM) symbol. In order to obtain diversity gain from the virtualized antennas, it is necessary to vary the signal transmitted among them such that the effective antenna patterns are different for different time-frequency elements. (A time-frequency element may be defined as the smallest data or signal bearing unit of a physical layer. For example, for LTE, a resource element is a time-frequency element. For CDMA systems, a chip time is a time-frequency element.) This is done in FIG. 2 by multiplying the signals on the second antenna 220b with the complex weight sequence $w_1(k)$ 210. This complex weight sequence 210 allows the effective antenna pattern of the virtualized antennas to vary over the transmission of a single coded block of information bits, and to therefore provide diversity. If $w_1(k)$ 210 is fixed such that the same weight value is applied to all the frequency domain components of an OFDM symbol, but different weight values are used in the time domain for different OFDM symbols or slots containing one coded block, this corresponds to precoding vector switching (PVS). If $$w_1(k) = e^{j\frac{2\pi D}{N}k}$$

(where N is the number of samples in the fast Fourier transform (FFT) and D is the delay in time domain samples) is fixed such that the same weight value is applied to all the time domain components of an OFDM symbol (e.g., OFDM symbols or slots) containing one coded block, but different weight values are used in the frequency domain (for different subcarriers or groups of subcarriers), this corresponds to cyclic delay diversity (CDD). (CDD can of course be implemented in the time domain.) This paragraph will be referred to below as Note 1.

In order to allow efficient transmission through a power amplifier, it is desirable to only alter the phase of the transmitted signal, as can be done by setting $w_1(k)=e^{j\Theta_i(k)}$ for the $i^{th}$ virtual antenna. Since only a few distinct antenna patterns are likely to be needed, $w_i(k)$ can be set to be an element of $\{+1,-1,+j,-j\}$ for all the virtualized antennas, allowing a simple implementation of the phase shift. Furthermore, when the reference signals are transmitted in a time division multiplexing (TDM) fashion occupying all of an OFDM symbol as is done for the LTE uplink, it is desirable to keep $w_i(k)$ constant over an entire slot so that the reference symbol is transmitted with the same effective antenna pattern as all the other OFDM symbols in the slot.

The LTE PUCCH has two major sets of formats: 1, 1a, and 1b, and 2, 2a, and 2b. The format 1 set carries at most two bits and is used for HARQ acknowledgement/negative acknowledgement (ACK/NACK) and scheduling request signaling. The format 2 set carries at most 13 information bits containing channel quality information (CQI), rank indication (RI), and preceding matrix indications (PMI). The present disclosure concentrates on format 2, as the greatest benefit of the embodiments herein is for control channels with more than a few bits, such as format 2.

Figure 3:
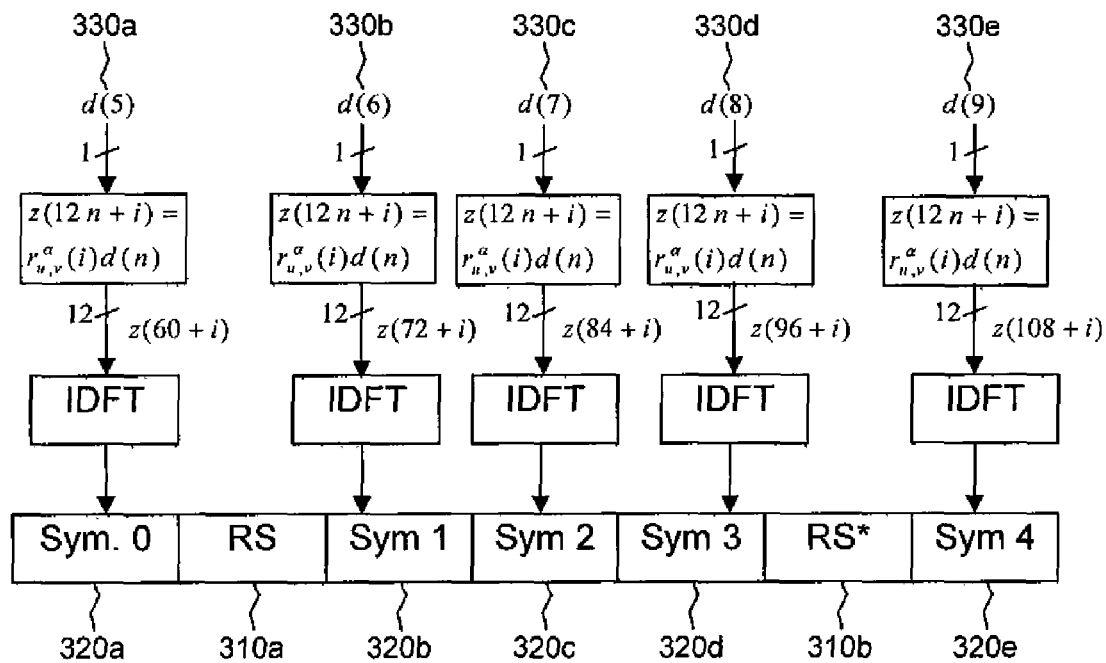
FIG. 3 is a diagram of the PUCCH (Physical Uplink Control Channel) format 2 structure and spreading, according to the prior art.

The structure of slot 2 of PUCCH formats 2, 2a, and 2b is shown in FIG. 3. The first slot has the same structure for formats 2, 2a, and 2b, but carries symbols d(0) through d(4). The only difference between format 2 and formats 2a and 2b is that the second RS 310b of formats 2a and 2b is modified to carry an ACK/NACK symbol in both slots. Therefore, the present disclosure concentrates on format 2.

For format 2, each PUCCH slot is composed of five OFDM symbols 320 that carry data and two OFDM symbols 310 that only carry reference signals. Each data-bearing bearing OFDM symbol 320 is associated with one quadrature phase-shift keying (QPSK) modulation symbol, d(n) 330, that represents two coded bits. Each d(n) 330 is spread with the sequence, $r_{u,v}^{\alpha}(i)$, such that it is 12 samples long (which is the number of subcarriers in an LTE resource block). This spreading can be expressed with the equation $z(12n+i)=r_{u,v}^{\alpha}(i)d(n)$. There are 12 orthogonal spreading sequences in LTE, which therefore allows up to 12 UEs to transmit on the same OFDM subcarriers in PUCCH formats 2, 2a, and 2b. Next, the spread samples are mapped to the 12 subcarriers the PUCCH is to occupy and then converted to the time domain with an inverse discrete Fourier transform (IDFT) to create each OFDM symbol. (Since the PUCCH is not transmitted simultaneously with other physical channels in LTE at present, the subcarriers that do not correspond to the PUCCH are set to zero.)

PUCCH decoding is not as challenging as many decoding problems today whose block lengths are thousands of bits. PUCCH CQI transmissions have only up to 13 information bits, and so even a brute force search of all possible code words is not computationally prohibitive. Nevertheless, fast Hadamard transform (FHT) based approaches can be used to dramatically speed up maximum likelihood (ML) reception, and these may be of interest to infrastructure vendors.

The channel code used in LTE on PUCCH formats 2, 2a, and 2b is in the family of Reed-Muller (RM) codes, and well known high performance ML receivers can be constructed using an FHT. Variants of these codes are likely to be used in LTE-A, and the present disclosure provides some variants. As discussed below, the use of FHTs can dramatically reduce the decoding complexity. The following discussion briefly explains how FHTs can be used to decode a Reed-Muller code, but does not describe the derivation of the method.

Figure 4:
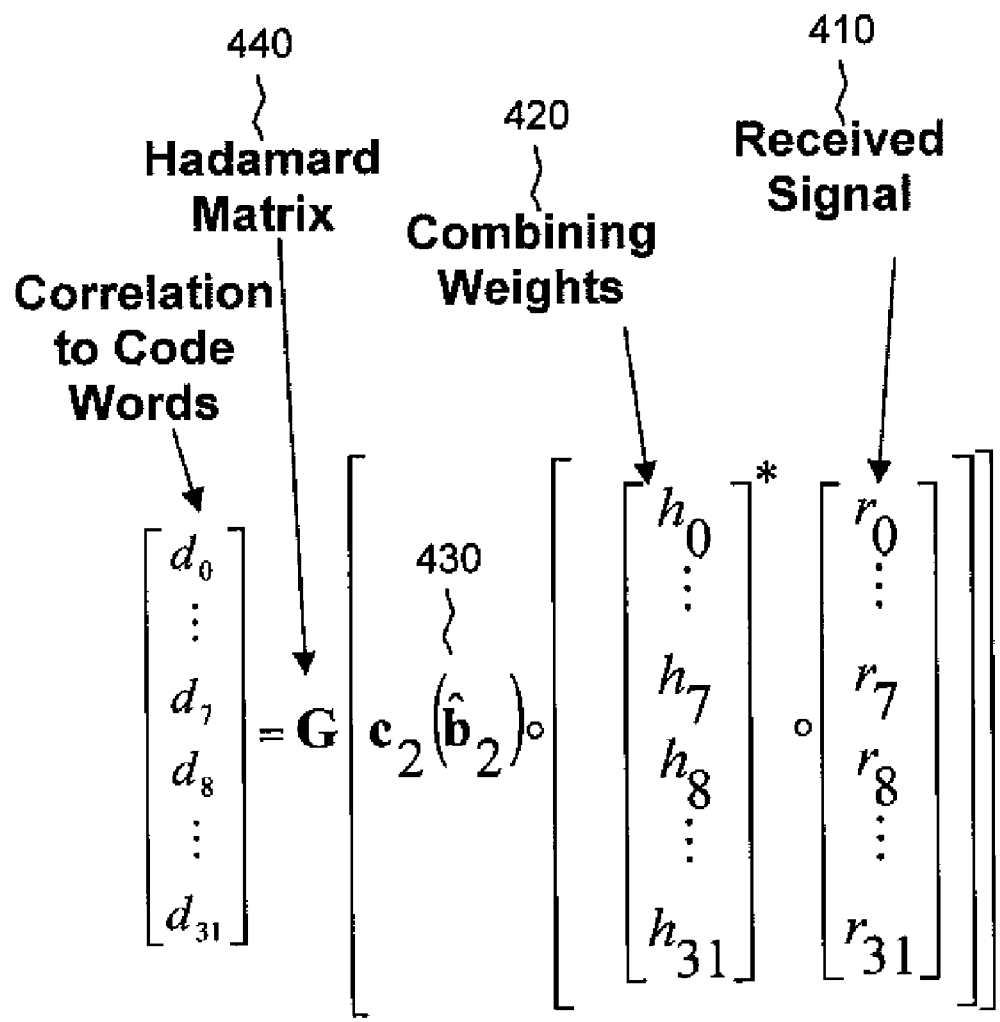
FIG. 4 is a diagram of a receiver structure, according to the prior art.

A receiver structure that uses FHT-based decoding is shown in FIG. 4. In this figure, bold capital symbols are matrices, bold lower case symbols are vectors, and ° indicates element-wise multiplication. Also, throughout this discussion, a (32,10) code is assumed for concreteness. That is, 10 information bits are input to the encoder, which then produces an output of 32 channel bits (or channel coded bits). This results in a code rate of 10/32 or approximately ⅓.

Each element of the received signal vector, r 410, is first multiplied by a corresponding element of a (channel dependent) combining weight vector, h 420. A simple OFDM receiver might use a matched filter receiver, where the elements of h 420 are the complex conjugate of the channel estimate corresponding to the subcarrier and time slot that the received signal passes through. For the moment, the $c_2(\hat{b}_2)$ 430 term is assumed to be all ones and is neglected. Once the combining-weight vector 420 has been applied, the decoder combines the weighted received signal elements according to each of the possible code words that correspond to each possible information bit sequence. This combining is done in FIG. 4 by multiplying with the (32 row, 32 column) matrix G 440. It turns out that the $n^{th}$ order Hadamard matrix is a subset of the $n^{th}$ order Reed-Muller code, and so the decoder's combining can be done (at least in part) with G 440 being a Hadamard matrix, or equivalently by taking an FHT. Taking an FHT is computationally preferable and a candidate to be used in any implementation.

The LTE PUCCH formats 2, 2a, and 2b code is in the family of $5^{th}$ order Reed-Muller codes, and so a $5^{th}$ order FHT is used to decode. Each of the $2^5=32$ outputs of the FHT corresponds to one hypothesized code word, so $\log_2(32)=5$ information bits may be decoded with the FHT. Since there are 10 information bits to decode, a way of dealing with the remaining five bits is needed.

Figure 5:
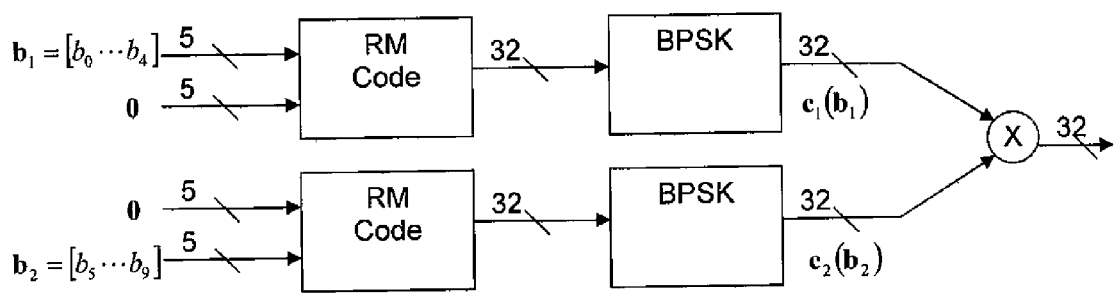
FIG. 5 is a diagram of an encoder split into two five-bit paths, according to the prior art.

As shown in FIG. 5, since Reed-Muller codes are linear block codes, a binary phase-shift keying (BPSK) modulated encoder output can be expressed as the product of two modulated, encoded, information bit sequences, where each of the sequences is composed of five zeros and five of the information bits. Therefore, if one of the five information bit sequences is known, a modulated, encoded 10 information bit sequence can be multiplied (or "masked") by the modulated, encoded sequence corresponding to the known five information bit sequence to produce a sequence that is uniquely determined by only the five unknown information bits.

Returning to FIG. 4, if $c_2(\hat{b}_2)$ 430 is set to one of the 32 modulated, encoded sequences corresponding to five of the information bits, the effect of those five information bits is masked off and the remaining five information bits can be decoded with the FHT. Therefore, the kernel of the decoding process consists of hypothesizing a sequence of five information bits, masking the combining weighted received signal with a modulated, encoded sequence, taking an FHT of the masked sequence, and storing the value with the greatest correlation as well as the 10 information bits that produced it. This kernel process is iterated over each of the 32 hypotheses, and the final decoded 10 information bit sequence is selected as the one with the greatest correlation out of all the iterations.

The FHT-based method requires 32 complex multiplies for the combining weights, and then for each iteration requires N $\log_2 N=32\times 5$ real adds and subtracts for the FHT. Therefore, the total computation is 32 complex multiplies+32×(32×5) =5120 adds. A brute force decode has the 32 complex multiplies for the combining weights, but requires 32 adds and subtracts for each of the 1024 code words, for a total of 32×1024=32768 adds. Therefore, the number of adds can be reduced by more than a factor of six by using FHT-based techniques.

Uplink spatial multiplexing is already an agreed part of the current LTE-A work in 3GPP, and uplink transmit diversity techniques are under consideration for standardization. A variety of uplink transmit diversity schemes have been proposed, but each has one or more drawbacks. For example, the proposed schemes might use extra uplink time-frequency resources, for instance by transmitting the same symbol on different orthogonal resources. (A time-frequency resource may be defined as the smallest unit of a physical channel that can carry a complete modulation symbol when transmitted on a single antenna. For the LTE PUSCH, a resource element is a time-frequency resource. Since the LTE PUCCH is spread with an orthogonal sequence across subcarriers, for the PUCCH, a time frequency resource comprises multiple subcarriers spread with the spreading sequence. For CDMA systems, a time-frequency resource comprises multiple chip times spread with the spreading sequence. An orthogonal resource may be defined as a portion of a physical channel identified by the orthogonal spreading sequence used to spread modulation symbols within the orthogonal resource across multiple time-frequency elements. For the LTE PUCCH formats 2, 2a, and 2b, an orthogonal resource is a portion of the PUCCH identified by a length 12 spreading sequence used to spread it. Similarly, for UTRA HS-DPCCH, an orthogonal resource is a portion of an HS-DPCCH identified by a length 256 sequence used to spread it.) The proposed schemes might also increase the peak-to-average transmit power ratio (or "cubic metric"), leading to higher peak power requirements for the UE power amplifiers. In addition, the proposed schemes might reduce robustness to multipath by requiring nearly the same channel response on different subcarriers. Also, the proposed schemes might require an even number of OFDM symbols, which cannot always be provided.

Figure 6:
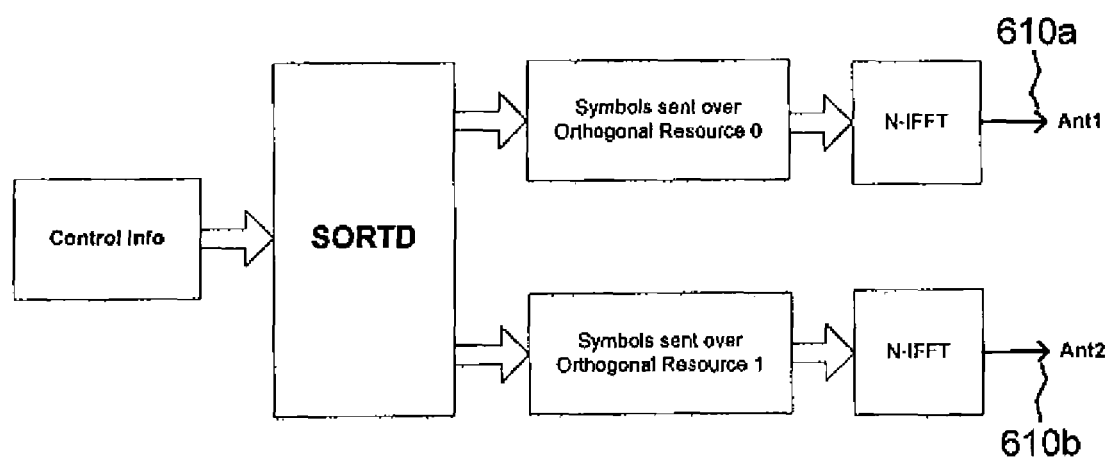
FIG. 6 is a diagram of SORTD (Space-Orthogonal Transmit Diversity), according to the prior art.

There are two main classes of transmit diversity approaches being considered in 3GPP for LTE-A PUCCH transmission. The first class of methods is space-orthogonal transmit diversity or SORTD (also known as space-code transmit diversity or SCTD). As can be seen in the two antenna example in FIG. 6, in this approach each antenna 610 transmits over a different orthogonal resource that carries the channel coded control information of the PUCCH.

Figure 7:
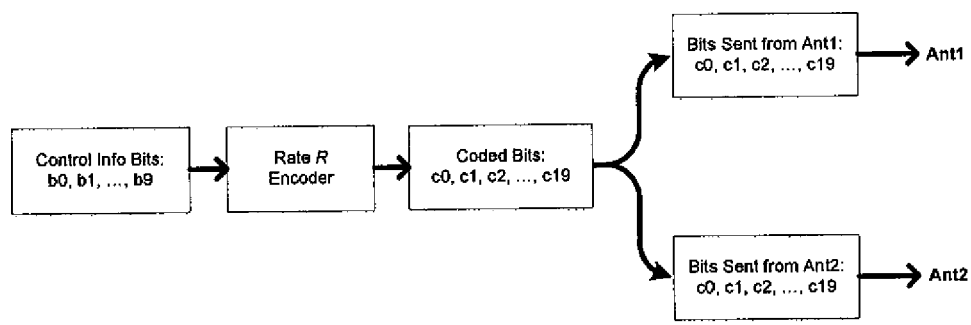
FIG. 7 is a diagram of simple repetition for SORTD, according to the prior art.

There are two variants of SORTD. In the first variant, the channel coded bits are duplicated before spreading with the orthogonal sequence associated with each antenna. This is shown in FIG. 7. This method provides maximum diversity gain in a flat fading channel, because the channel coded bits can be perfectly separated using the two orthogonal spreading sequences. The disadvantage of this approach is that two orthogonal resources are used, which means that half as many users can share the same PUCCH as compared with the case where each UE would only use one PUCCH orthogonal resource.

Figure 8:
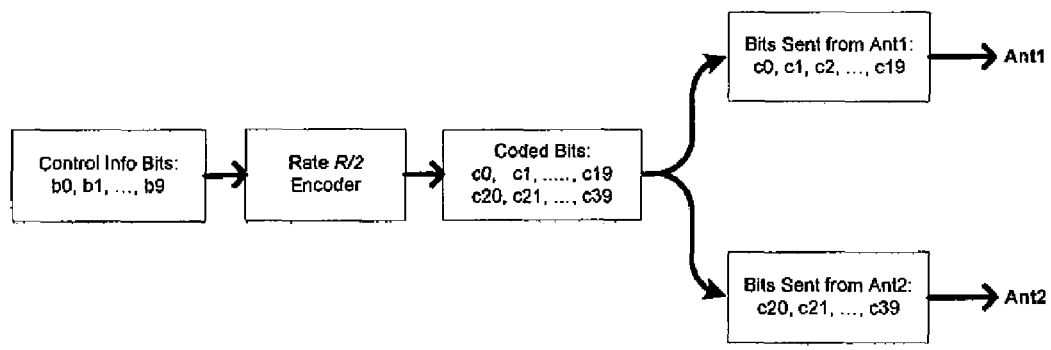
FIG. 8 is a diagram of joint coding for SORTD, according to the prior art.

In the second variant, called space-orthogonal spatial multiplexing or SORSM and shown in FIG. 8, a lower rate encoder is used and different channel coded bits are transmitted on the orthogonal resources and antennas. This variant has better performance than the simple repetition approach due to the increased coding gain of the R/2 rate code. However, it shares the same disadvantage as the first variant: two orthogonal resources must be used for each PUCCH transmitted. This disadvantage is targeted by the embodiments described herein.

Figure 9:
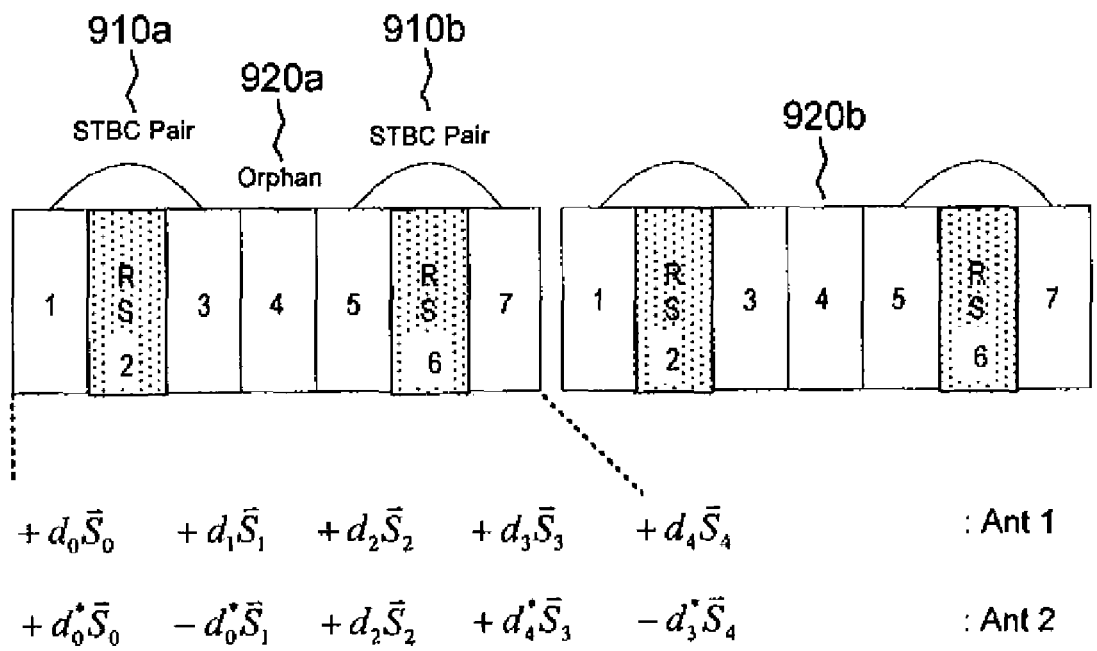
FIG. 9 is a diagram of STBC (Space Time Block Code) for PUCCH format 2, according to the prior art.

The second class of methods is the space time block codes already mentioned. Since STBCs often operate on pairs of symbols, their direct application on PUCCH format 2 is difficult, because each slot could have five symbols for PUCCH transmission. As shown in FIG. 9, this means that there can be two STBC pairs 910 (such as symbols 1 and 3 and symbols 5 and 7) and one "orphan" symbol 920 (symbol 4) per slot. (The orphan symbol 920a in the first slot cannot be paired with the one 920b in the second slot because the two slots are typically transmitted on well-separated frequency bands. The large frequency separation means that the symbols will pass through substantially different channel responses, making them unsuitable for STBCs.) While there are a variety of solutions to coding the "orphan" symbol, these tend to have worse performance than normally-paired STBC, and can be more complex to receive.

Virtualized antenna schemes such as the CDD and PVS schemes discussed above have also been discussed for use in LTE-A. While they often can be used without explicit standardization, they tend to have worse performance than the space-orthogonal or STBC approaches.

Embodiments of the present disclosure address the drawbacks of these existing solutions with a Low Code Rate Spatial Multiplexing method. The operation of Low Code Rate Spatial Multiplexing, or LCRSM, will be explained by comparing it to prior art multi-antenna transmission techniques. While LCRSM is hereinafter described in the context of its use in a UE, other embodiments are possible wherein LCRSM is used in an access node.

Figure 10:
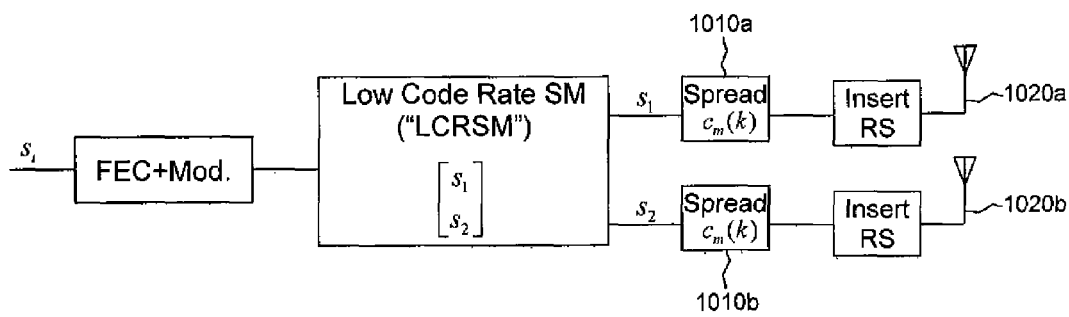
FIG. 10 is a diagram of low code rate spatial multiplexing, according to an embodiment of the disclosure.

FIG. 10 shows the low code rate spatially multiplexed approach. In contrast to the transmit diversity and spatial multiplexing shown in FIG. 1, this approach uses an FEC with half the channel code rate that would be used for single antenna transmission with the same number of information bits. As discussed above, spatial multiplexing is generally intended to increase the information bit rate, so the approach in LCRSM of halving the code rate relative to a single antenna transmission may seem counter-intuitive, as LCRSM is transmitting more channel coded bits rather than more information bits. Here, each antenna path spread is shown with spreading sequence $c_m(k)$ 1010 associated with the $m^{th}$ orthogonal resource on the $k^{th}$ time-frequency element being spread. As is done for spatial multiplexing, the modulated symbols are split evenly between the antennas 1020, one orthogonal sequence (i.e., the one with index m) is used for both antennas 1020, and the spread modulated symbols are transmitted simultaneously. This then drives the coding rate per antenna 1020 up to the same rate as in the STBC code. Therefore, unlike spatial multiplexing, the method does not increase the information bit rate. However, the lower code rate allows more robust transmission and more coding gain. This more robust transmission makes LCRSM applicable for low error rate transmission.

LCRSM does not require the code rate to be halved relative to single antenna transmission with the same number of information bits. However, because LCRSM is designed to operate as a diversity method, for two transmit antenna LCRSM, the number of information bits should be less than or equal to the number of channel coded bits contained in the time-frequency resources used to carry the information bits. If the number of information bits is greater than the number of channel coded bits contained in the time-frequency resources, all the information cannot be transmitted through one of the antennas, and so at least a portion of the information will not experience transmit antenna diversity. Put another way, in this case at least a portion of the information is independent between the antennas, in contrast to transmit antenna diversity which requires redundant transmission of the information on the antennas.

Similarly, in order to achieve transmit diversity, there should be more channel coded bits than information bits such that some channel coded bits derived from an information bit are present on multiple antennas. This may require that the ratio of channel coded bits to information bits be greater than one for LCRSM with any number of antennas.

This low code rate spatially multiplexed approach is especially suitable for use on the PUCCH because, as discussed above, high performance ML receivers are possible with computationally efficient algorithms. ML receivers are well known to often improve spatially multiplexing performance, and so their availability for use with PUCCH makes LCRSM more desirable.

One benefit of LCRSM is that it gracefully falls back to single antenna transmission, and the same error correction code and decoder structure can be used for both single antenna and LCRSM. Since N times more parity bits are generated with N-antenna LCRSM, the LCRSM channel code can be constructed such that the coding for single antenna transmission is a subset of LCRSM. For N-antenna LCRSM, this can be done by setting 1/N of the channel coded bits in LCRSM to be identical to those of single antenna transmission for a given set of information bits.

It should be noted that the eNB estimates the channel corresponding to each UE antenna. The typical approach for this is to transmit a distinct reference signal on each antenna, which can use additional orthogonal resource. For the purposes of the present embodiments, it is assumed that the use of additional orthogonal resources for data, but not for the reference signals, limits the available orthogonal resources. This assumption is made because there are a variety of ways to create additional orthogonal reference signals. For example, it is possible to spread the reference signals more in frequency and/or time in order to create more orthogonal reference signals.

LCRSM provides good performance while requiring a single orthogonal resource for all of a UE's transmit antennas. However, at least under some conditions, schemes such as SORSM that use different orthogonal resources for a UE's transmit antennas may have lower transmit power requirements than LCRSM. Therefore it can be beneficial to allow UEs to transmit with a variable number of orthogonal resources, using more orthogonal resources when more are available.

Figure 11:
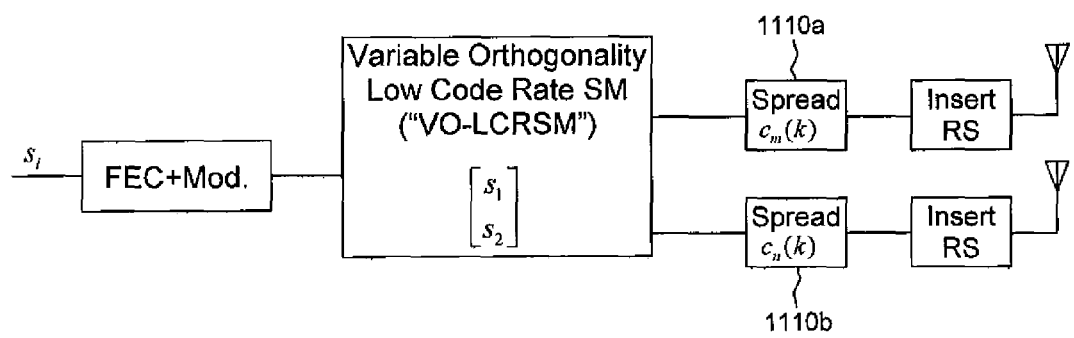
FIG. 11 is a diagram of variable orthogonality low code rate spatial multiplexing, according to an embodiment of the disclosure.

Therefore, LCRSM can be extended to use a variable number of orthogonal resources. This is diagrammed in FIG. 11. Here, each antenna path spread is shown with spreading sequence $c_i(k)$ 1110 associated with the $i^{th}$ orthogonal resource on the $k^{th}$ time-frequency element being spread. When unique resources are used for PUCCH data on all antennas (i.e. in FIG. 11, m≠n for all elements k), the transmitter operates in SORSM mode; when only one is used (m=n for all elements k), it is in LCRSM mode; and when some antennas transmit on the same resource and some do not (i.e., with m≠n for only some elements k, or in a multi-antenna case not shown), it is in a hybrid LCRSM-SORSM mode.

The most straightforward version of N-antenna LCRSM encodes each of the information bits with N-times more parity bits than are used in the single antenna case and multiplexes the parity bits among the antennas such that each antenna carries 1/N of the parity bits. This then implies that each information bit must be encoded with at least N parity bits.

This behavior is in contrast with space time block coding, wherein the same coded bit is repeated in different symbols, and wherein the symbols may be transmitted in different time or frequency resources, with the symbols possibly having a sign change and/or conjugation. LCRSM simply divides the channel coded bits among the antennas without repetition, sign change, or conjugation. It is this combination of low code rate and multiplexing behavior that makes it "spatially multiplexed" transmit diversity.

In contrast to prior art spatial multiplexing, due to the improved robustness of the LCRSM approach, the error detection bits (typically CRC bits) that enable link adaptation to be used are not added. This allows spatial multiplexing to function in fading channels. This ability to operate without error detection bits is particularly important for control channels such as the PUCCH that have small payloads where the overhead of the error detection bits would make the transmission inefficient.

Because LCRSM can produce low block error rates at low SNR conditions, it is suitable for use on control channels such as LTE's PUCCH formats 2, 2a, and 2b. This channel carries a small payload consisting of uplink channel information (UCI) that may be channel quality information (CQI), a precoding matrix indication (PMI), and/or a rank indication (RI). A (20,A) block code is used to encode up to A=13 bits. It may be desirable to develop a code that is similar to this (20,A) code because it has good performance, is simple to decode, and is backward compatible with LTE. A code with half the rate, and therefore twice the number of channel bits, is needed. It turns out that the PUCCH format 2, 2a, and 2b data may also be carried on the physical uplink shared channel (PUSCH) using a (32,A) code that can encode up to A=11 bits. Therefore, this code merely needs to be extended by eight channel bits and lengthened by two information bits to get a (40,A) code with up to A=13 bits.

There are a number of ways to extend and lengthen the code. They all can be represented by expanding the size of the code's generator matrix. The generator matrix H of the (40,A) code is diagrammed in FIG. 12a. Each $f_{i,j}$ and $g_{i,j}$ is a bit. The 32 row×11 column F matrix containing entries $f_{i,j}$ is a reordered version of the (32,A) original code. (It is reordered such that the standard FHT matrix can be used in decoding. The reordered version is given in Table 1 1310 of FIG. 13.) The expanded part is the two last columns and the eight last rows containing entries $g_{i,j}$.

One of the simplest ways to expand the code is to set each $g_{i,j}$ to a random bit. The code's performance can then be checked, for example by encoding all the $2^{13}$ code words when A=13, and checking their Hamming weights. A number of extended codes can be generated, and the one with the best properties (such as the one with the largest minimum Hamming weight) can be selected as the extended code.

While a randomly extended and lengthened code will likely have reasonable performance, it will not have the same structure as the original codes. The LTE (32,A) code can be soft decoded by use of a fast Hadamard transform (FHT). If the added rows to H are random, this is no longer possible, and the receiver will be more complex than it needs to be. Therefore, an alternative way to extend the code is considered.

The code is first lengthened by appending two 32 element long columns to F. This might be done by cyclically shifting the last column of F by two and eight elements, such that the two new columns are as shown in FIG. 12b. The lengthened code, $H_{12}$, can then be constructed as shown in FIG. 12c.

The more critical aspect to the code design from a structural point of view is how it is extended. In an embodiment, the last eight rows of H are produced by copying the first eight rows of $H_{12}$ and multiplying it in GF(2) (Galois Field (2)) by a diagonal spreading matrix, S. That is, each row of $H_{12}(1:8,:)$ is either unchanged or set to all zeroes, depending on whether $s_i$ is '1' or '0', respectively. This is shown in the equations in FIG. 12d, where the notation $H_{12}$ (1:8,:) indicates the first 8 rows of and all columns of $H_{12}$.

Since there are 8 bits in S, there are 256 possible codes that can be constructed with this choice of $H_{12}$. A search of these codes shows that the sequence $[s_1\ s_2\ \ldots\ s_8]=[1010011]$ produces a code with good distance properties.

Another alternative to lengthen and extend the code is to use a $G_{21}$ that has a submatrix with low rank. For example, H might be constructed as shown in FIG. 12e, where:

S is an 8×8 diagonal matrix (with the same structure as above). In this case the sequence $[s_1\ s_2\ \ldots\ s_8]=$ [01110111] produces a code with good distance properties.
 $Z_5$ is an 8×5 matrix of all zeros.
 $E_6$ is an 8×6 truncated identity matrix, where the nth column has a one in the nth row, and the matrix is zero otherwise.
 $M_1=[10101010]$.
 $O_1$ is an 8×1 matrix of all ones.

As discussed below, because $Z_5$ is rank one, it is simpler to decode the five information bits its columns correspond to.

There are clearly many other ways to extend the Reed-Muller codes using these or similar techniques. However, the fundamental ideas of extending by repeating the rows of a base code and spreading or using an extended code with a low rank submatrix provide two fairly broad approaches that allow computationally efficient decoding. It should be noted that the case of simple repetition of the rows of $H_{12}$ is a subset of the repeating and spreading method, where S is the identity matrix.

More generally, other codes suitable for short block sizes, such as tail-biting convolutional codes can be used for LCRSM. The code need only support a sufficiently low rate to allow the channel coded bits to be multiplexed among the antennas.

Descriptions are now provided of how to decode the LCRSM codes developed using the repeat-and-spread and the low-rank extension methods. While these methods focus on decoding approaches for BPSK transmissions on single antennas, they illustrate the key aspects of the decoding process needed for multiple antenna transmissions with higher order modulation (such as QPSK) and can be straightforwardly extended to decode these transmissions.

Decoding a repeat-and-spread extended code with an FHT is a relatively straightforward extension of the FHT-based decoder discussed above. This is shown in FIG. 14. The idea is to reduce the number of channel coded symbols to match the base block code by combining the repeated and spread symbols with the symbols they are repeated from. To do this, the weighted repeated symbols are multiplied by the BPSK-mapped version of the spreading symbols to remove the spreading, and then the result is added to the corresponding weighted symbol it is repeated from. The combining weights should be scaled such that the power of the combined repeated symbols is the same as the combined non-repeated symbols so that orthogonality is maintained. This scaling is indicated with the factor of ½ in the figure. This leaves a number of received symbols that is the same as the original case, and the same procedure can be applied as in the original version of the code: masking with each hypothesis, applying FHTs, etc.

The computational complexity to decode the repeat-and-spread extended code is quite close to that of the original code. Assuming that the despreading is lumped into the received combining weights, only eight additional complex multiplies are needed for the entire decoding process.

Decoding the low-rank extended code is a little more complex. In this case, the correlation d is initialized as in FIG. 4, but then correction terms are added to account for the last eight channel coded bits. For each hypothesis, a correction term δ is computed by correlating the spreading with the masked, weighted received symbols, as shown in FIG. 15. Then δ is added to $d_i$ if i has odd Hamming weight, and subtracted if i has even Hamming weight.

As in the repeat extended case, eight additional complex multiplies are needed. However, eight adds are needed to compute δ plus 32 more adds to accumulate $d_i$ for each hypothesis, leading to (40*32)=1280 additional adds to decode the revised code. The total number of adds is then 1280+5120=6400 adds. This compares quite favorably with the 40*1024=40960 adds needed to do a brute-force search of the code. If a random code is used, then the last eight bits would need to be exhaustively searched, so the total would be 8*1024+5120=13312, about twice as computationally expensive as the low-rank extended code. The random code becomes even more expensive relative to the low-rank and repeat extended codes as the number of information bits grows.

Since the eNB will generally control the assignment of orthogonal resource, aspects needed to implement VO-LCRSM are to use distinct spreading sequences on the antennas on a portion of the time-frequency elements, and to indicate the orthogonal resources assigned to the antennas to the UE. It is possible to have this assignment be fixed or variable. If variable, the assignment could vary semi-statically or more rapidly, changing at the subframe, slot, or even OFDM symbol rate. Based on the following analysis, an embodiment is considered where the orthogonal resources assigned to each antenna are set using higher layer signaling.

As discussed above, each antenna in VO-LCRSM is spread with an orthogonal resource that is selected by the eNB, and may be, but is not always, different from that used on another antenna. The orthogonal resource in an LTE- or LTE-A-based embodiment is the frequency domain cyclic shift spreading currently used for LTE Release 8, but in general could be any sequence that spreads a symbol in time and/or frequency such that it has low correlation to the other spreading sequences that may be used on the same physical channel, and therefore allows a receiver to linearly separate the transmissions on the antennas.

One embodiment well suited to LTE-based systems is to vary the orthogonality on a per slot basis. In one slot, some or all of the antennas can transmit using one number of orthogonal resources, while in the other slot a different number of orthogonal resources can be used.

A two antenna embodiment is now considered. Table 2 1320 in FIG. 13 shows the index of the orthogonal resources used by each of nine users in the two slots. In the first slot 1330 users 1, 2, and 3 transmit using a different orthogonal resource on each antenna, while in the second slot 1340 they transmit using the same orthogonal resource on both antennas. Similarly, users 4, 5, and 6 transmit with one resource in the first slot 1330, but two resources on the second slot 1340. Finally, users 7, 8, and 9 transmit with one resource in both slots. By contrast, if all users must transmit on two resources in both slots, the result is a configuration that supports fewer users, as shown in Table 3 1350 in FIG. 13.

Therefore, one benefit of this approach is that it allows a performance-multiplexing tradeoff: more users can transmit on the same time-frequency resources than when two orthogonal resources per user are used in both slots, while there is a performance gain from using two orthogonal resources in one slot relative to when only one orthogonal resource is used in both slots.

PUCCH formats 2, 2a, and 2b carry periodically transmitted CQI, and so one practical approach is to assign orthogonal resources to UEs using these formats through higher layer signaling (as is done in LTE Release 8). One way to signal the resources is to indicate to each UE a set of UE-specific orthogonal resources and the time-frequency resources on which each orthogonal resource is to be used. In an LTE or LTE-A system, orthogonal resource for the antennas would be assigned through higher layer signaling such as radio resource control (RRC) signaling or medium access control (MAC) control elements.

In the two antenna embodiment, the indications can be simplified to two integers for the two orthogonal resources and two bits (one for each slot) indicating if the second orthogonal resource is used in each slot. When this signaling approach is used, the first resource is a 'primary' resource for the UE, and will not likely be assigned to another UE that shares the same time-frequency resource, because this would cause interference among the UEs. However, the second orthogonal resource is more likely to be assigned to more than one UE because it is not always used in a given slot (as can be seen from Table 2 1320 in FIG. 13).

As is well known in the art, a UE can be configured by higher layer signaling (RRC) to periodically report CQI using a particular PUCCH resource and with a specified periodicity.

For purposes of simplicity, an illustrative example can be assumed with two UEs, where UE 1 reports CQI with a periodicity of P while UE 2 reports CQI with a periodicity of 2P (or some other integer multiple of P). The two UEs can be assigned two orthogonal PUCCH resources to share. At the CQI reporting time points for UE 2 (when UE 1 will also be reporting CQI), UE 2 will use one orthogonal PUCCH resource while UE 1 will use the other orthogonal PUCCH resource. During the CQI reporting time points for UE 1 at times when UE 2 is not reporting CQI, UE 1 can use both of the orthogonal PUCCH resources in order to obtain more reliable signaling.

During the higher layer configuration of CQI reporting and associated PUCCH resources, each UE would be instructed as to the periodicity and relative subframe offset as to which PUCCH resources it could use. In the example of the previous paragraph, the following configuration could be made. UE 2 would be allowed to use orthogonal PUCCH resource B with a periodicity of 2P and a relative subframe offset of 0. UE 1 would be allowed to use orthogonal PUCCH resource A with a periodicity of P and a relative subframe offset of 0. UE 1 would also be allowed to use orthogonal PUCCH resource B with a periodicity of 2P and a relative subframe offset of P. This would avoid resource collisions with UE 2.

Of course, the above is an illustrative example only, and such time sharing of orthogonal PUCCH resources could occur within a group of two or more UEs, with more than two orthogonal PUCCH resources, and with different periodicities for different UEs (provided that all periodicities were multiples of some common base value).

It may be preferable to use as many transmit antennas as possible in order to make efficient use of power amplifiers. As discussed above, LCRSM can support multiple antennas by using at least N parity bits for each information bit, and multiplexing the parity bits evenly among N antennas. This will provide increasing coding gain with the number of antennas. However, the growth in coding gain diminishes as the code rate drops, such that at some point repeating the parity bits has similar performance to a lower rate code with the same number of channel coded bits. Since using repetition can allow simpler decoders to be used, it is attractive from an implementation point of view.

Since only one reference signal is normally used for antenna virtualization, independent channels among the eNB and UE antenna pairs cannot be separately estimated using the reference signal. The lack of independent channel estimates for the antenna pairs then precludes the coherent demodulation of distinct parity bits on each of the virtual antennas. This could make the straightforward approach of using LCRSM with N parity bits for N virtual antennas impractical.

Figure 16:
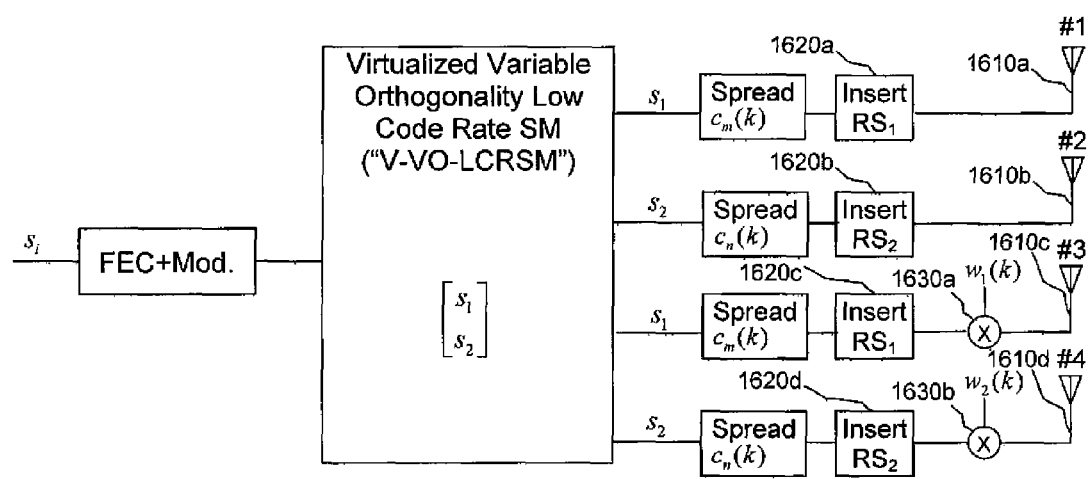
FIG. 16 is a diagram of virtualized variable orthogonality low code rate spatial multiplexing, according to an embodiment of the disclosure.

Since distinct parity bits are unattractive for antenna virtualization, repetition may be preferable. FIG. 16 shows a virtualized version of VO-LCRSM using two pairs of virtualized antennas 1610. The top two antennas 1610*a* and 1610*b* in the figure have the normal VO-LCRSM transmission: each carries a distinct set of parity bits that are spread with a sequence that may be the same as or different from that of the other antenna. Also shown is the insertion of a distinct reference signal 1620 for each antenna 1610 that enables channel estimation for the antenna 1610. (While they were not described in the previous figures, distinct reference signals are used on each transmit antenna for all versions of LCRSM.) The reference signals 1620 are inserted after the spreading because the reference signals 1620 on the antennas 1610 will have different spreading from each other, whereas the spread modulation symbols in VO-LCRSM will often have the same spreading.

Antennas 1610*a* and 1610*c* in FIG. 16 are virtualized together to form one virtual antenna, while antennas 1610*b* and 1610*d* are virtualized together to form a second virtual antenna. The modulation symbol sequences $s_1$ and $s_2$ are each repeated and placed on the antennas 3 and 4, respectively. The modulation symbol sequences are then spread and a reference signal is added using the same spreading and reference signal as their corresponding virtual antenna. Therefore, up to this point, the signals on antennas 1 and 3 are the same, as are the signals on antennas 2 and 4. If the signals were simply transmitted at this point (i.e., set $w_1(k)=w_2(k)=1$), there will be no diversity gain from the pairs of virtualized antennas: the received signal from each pair will be a linear superposition of their channels with the same statistics as the original channels.

As discussed above, in order to obtain diversity gain from the virtualized antenna pairs, it is necessary to vary the signal transmitted among the pairs such that the effective antenna patterns are different for different time-frequency elements. This is done in FIG. 16 by multiplying the signals on antennas 3 and 4 by the complex weight sequences $w_1(k)$ 1630*a* and $w_2(k)$ 1630*b*, respectively. These complex weight sequences 1630 allow the effective antenna pattern of a virtualized antenna pair to vary over the transmission of a single coded block of information bits, and therefore provide diversity. In order to obtain the best diversity gain in a correlated scenario, $w_1(k)$ 1630*a* and $w_2(k)$ 1630*b* should be distinct sequences that create effective antenna patterns that are as orthogonal as possible for each time-frequency element k. Therefore, an embodiment suitable for an LTE-based uplink would be to select $w_1(k)$ 1630*a* and $w_2(k)$ 1630*b* from $\{+1,-1,+j,-j\}$ such that $w_1(k) \neq w_2(k)$, to use a single value of each of $w_1(k)$ 1630*a* and $w_2(k)$ 1630*b* over an entire slot, and to use different values for $w_1(k)$ 1630*a* and $w_2(k)$ 1630*b* in each slot. One way to do this would be to set $w_1(s)=j^s$ and $w_2(s)=j^{(s+C)}$ where s is an integer slot number, and C is a fixed integer, with C=1, 2, or 3.

As discussed in Note 1 above, there are alternative ways to vary the signal transmitted among the antenna pairs such that the effective antenna patterns are different for different time-frequency elements, including applying a delay to one or more of the virtualized antennas. Therefore, the multiplication by $w_1(k)$ and/or $w_2(k)$ can be replaced by any suitable transformation that sufficiently varies the antenna patterns across the time-frequency elements.

The LCRSM embodiments described herein provide for each coded channel bit to be mapped to a modulation symbol. This can be contrasted with prior art space-time coding schemes where channel coded bits are mapped to antennas by repeating, negating, and/or conjugating the modulation symbols the channel coded bits are mapped to. LCRSM does not require the use of multiple orthogonal PUCCH resources, and therefore allows more UEs to be multiplexed and operate within the same total PUCCH resources. Also, LCRSM can have better performance than transmit diversity methods that do use multiple orthogonal resources, such as SORTD. LCRSM is backward compatible, since an extension of the existing forward error correction codes used in LTE for the PUCCH may be used in LCRSM. Also, the same fast ML decoding methods used in LTE for PUCCH apply, and so the decoder computational complexity remains low and should be feasible for the eNB. In addition, the number of PUCCH information bits can be increased due to the longer code used in LCRSM. This larger PUCCH payload could be extremely beneficial in LTE-A. In contrast to block space time based coding approaches, LCRSM is easily extensible to four antennas: the code length can be increased to support the greater number of antennas or, as described above, the same code rate can be used and the greater number of antennas can be supported with antenna virtualization. LCRSM also avoids the drawbacks of other schemes, such as increased power amplifier peak power requirements.

Figure 17:
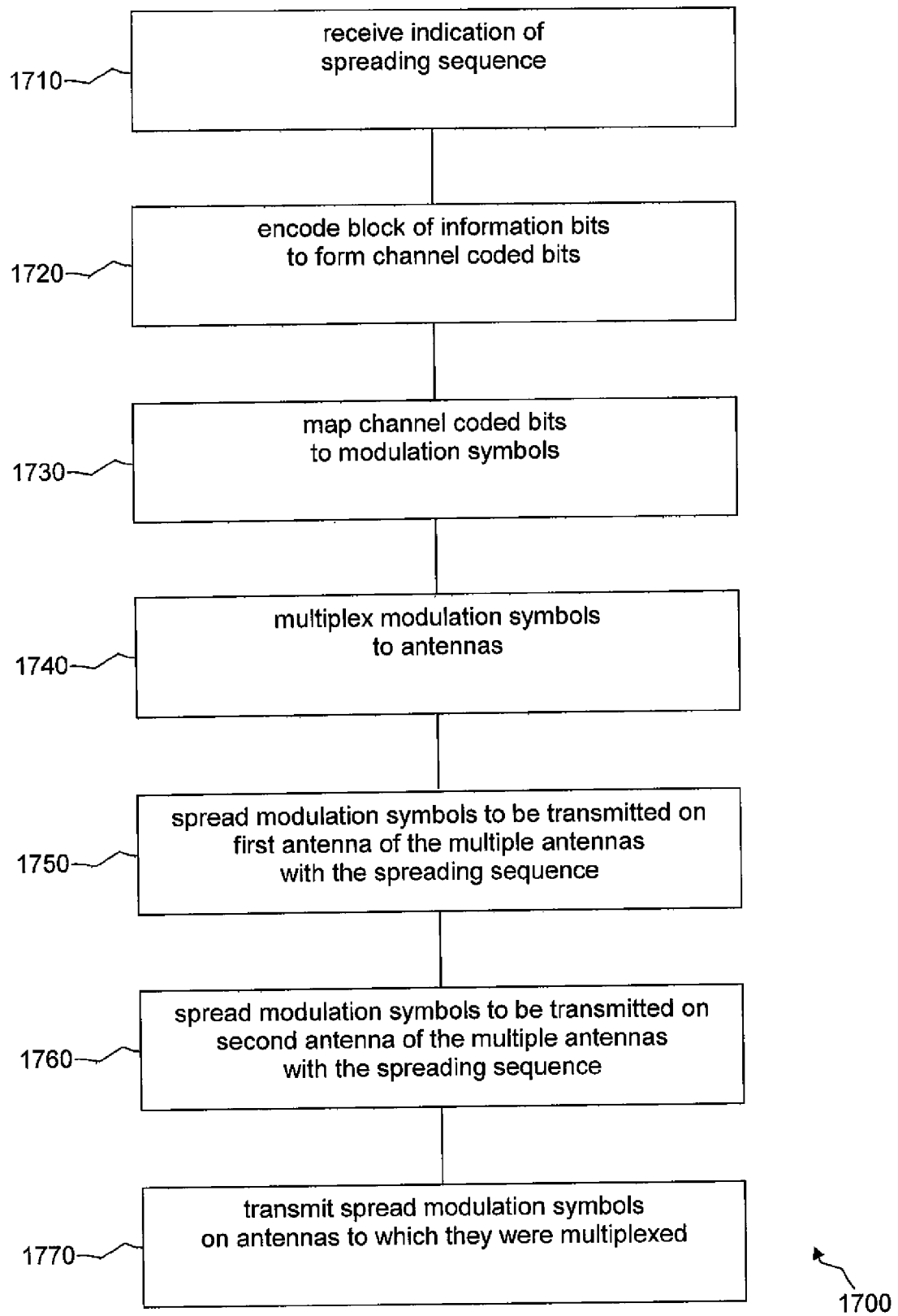
FIG. 17 illustrates an embodiment of a method for communication in a wireless telecommunications system, according to an alternative embodiment of the disclosure.

FIG. 17 illustrates an embodiment of a diversity transmission method 1700 for transmitting a low code rate spatially multiplexed channel on multiple antennas. At block 1710, an indication of a spreading sequence is received. At block 1720, a block of information bits is encoded to form channel coded bits. The ratio of the number of channel coded bits to the number of information bits is greater than one. At block 1730, the channel coded bits are mapped to modulation symbols. Each channel coded bit is mapped once to a modulation symbol. At block 1740, the modulation symbols are multiplexed to the multiple antennas. At block 1750, the modulation symbols to be transmitted are spread on a first antenna of the multiple antennas with the spreading sequence. At block 1760, the modulation symbols to be transmitted on a second antenna of the multiple antennas are spread with the spreading sequence. At block 1770, the spread modulation symbols are transmitted on the antennas to which they were multiplexed.

Figure 18:
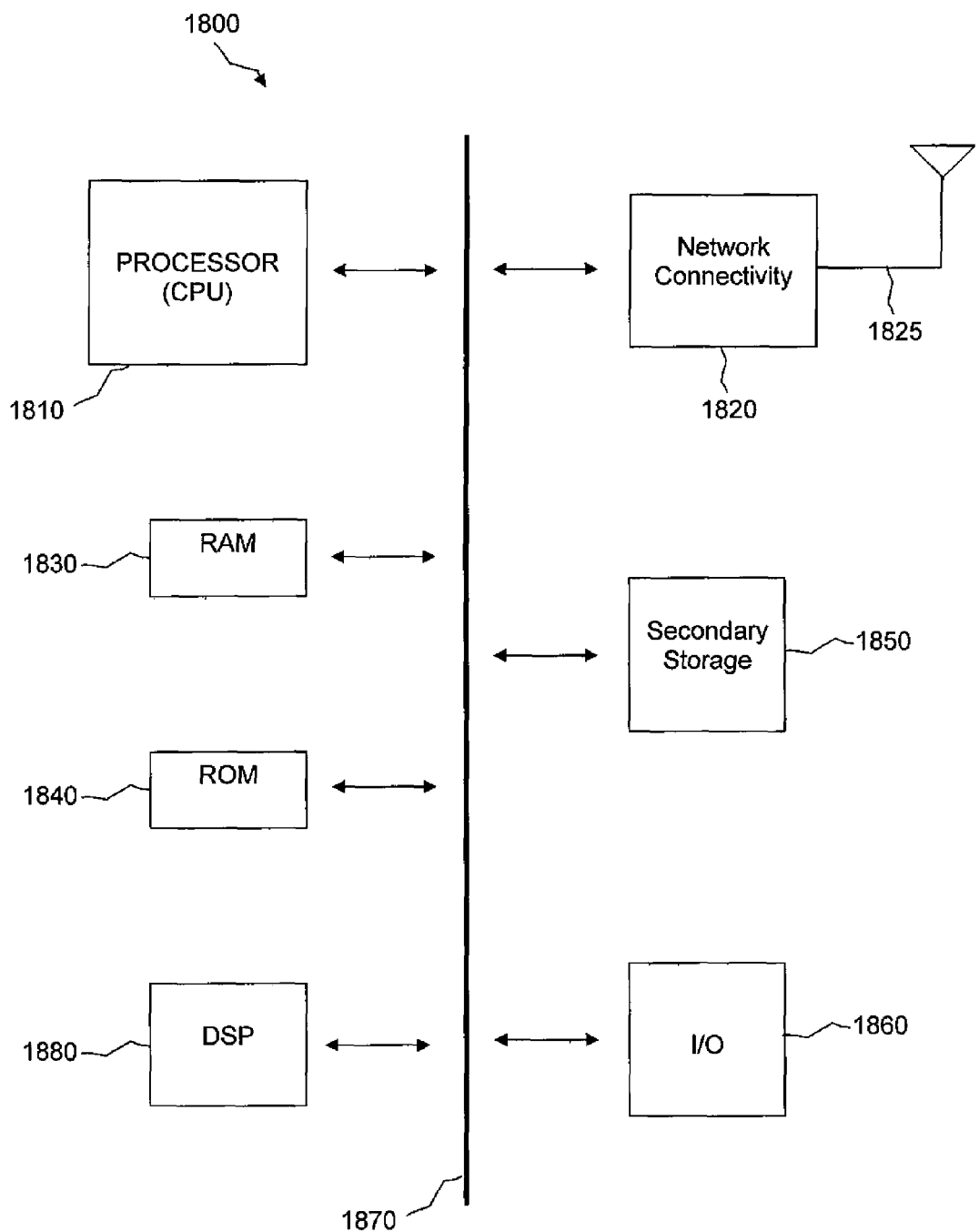
FIG. 18 illustrates a processor and related components suitable for implementing the several embodiments of the present disclosure.

The UE, access node, and other components described above might include a processing component that is capable of executing instructions related to the actions described above. FIG. 18 illustrates an example of a system 1800 that includes a processing component 1810 suitable for implementing one or more embodiments disclosed herein. In addition to the processor 1810 (which may be referred to as a central processor unit or CPU), the system 1800 might include network connectivity devices 1820, random access memory (RAM) 1830, read only memory (ROM) 1840, secondary storage 1850, and input/output (I/O) devices 1860. These components might communicate with one another via a bus 1870. In some cases, some of these components may not be present or may be combined in various combinations with one another or with other components not shown. These components might be located in a single physical entity or in more than one physical entity. Any actions described herein as being taken by the processor 1810 might be taken by the processor 1810 alone or by the processor 1810 in conjunction with one or more components shown or not shown in the drawing, such as a digital signal processor (DSP) 1880. Although the DSP 1880 is shown as a separate component, the DSP 1880 might be incorporated into the processor 1810.

The processor 1810 executes instructions, codes, computer programs, or scripts that it might access from the network connectivity devices 1820, RAM 1830, ROM 1840, or secondary storage 1850 (which might include various disk-based systems such as hard disk, floppy disk, or optical disk). While only one CPU 1810 is shown, multiple processors may be present. Thus, while instructions may be discussed as being executed by a processor, the instructions may be executed simultaneously, serially, or otherwise by one or multiple processors. The processor 1810 may be implemented as one or more CPU chips.

The network connectivity devices 1820 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, digital subscriber line (xDSL) devices, data over cable service interface specification (DOCSIS) modems, and/or other well-known devices for connecting to networks. These network connectivity devices 1820 may enable the processor 1810 to communicate with the Internet or one or more telecommunications networks or other networks from which the processor 1810 might receive information or to which the processor 1810 might output information.

The network connectivity devices 1820 might also include one or more transceiver components 1825 capable of transmitting and/or receiving data wirelessly on a plurality of antennas in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1825 might include separate receiving and transmitting units or a single transceiver. Information transmitted or received by the transceiver component 1825 may include data that has been processed by the processor 1810 or instructions that are to be executed by processor 1810. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1830 might be used to store volatile data and perhaps to store instructions that are executed by the processor 1810. The ROM 1840 is a non-volatile memory device that typically has a smaller memory capacity than the memory capacity of the secondary storage 1850. ROM 1840 might be used to store instructions and perhaps data that are read during execution of the instructions. Access to both RAM 1830 and ROM 1840 is typically faster than to secondary storage 1850. The secondary storage 1850 is typically comprised of one or more disk drives or tape drives and might be used for non-volatile storage of data or as an over-flow data storage device if RAM 1830 is not large enough to hold all working data. Secondary storage 1850 may be used to store programs that are loaded into RAM 1830 when such programs are selected for execution.

The I/O devices 1860 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1825 might be considered to be a component of the I/O devices 1860 instead of or in addition to being a component of the network connectivity devices 1820.

The following are incorporated herein by reference for all purposes: 3GPP TS 36.211, 3GPP TS 36.212, and 3GPP TR 36.814.

In an embodiment, a diversity transmission method for transmitting a low code rate spatially multiplexed channel on multiple antennas is provided. The method includes receiving an indication of a spreading sequence; encoding a block of information bits to form channel coded bits, wherein the ratio of the number of channel coded bits to the number of information bits is greater than one; mapping the channel coded bits to modulation symbols, wherein each channel coded bit is mapped once to a modulation symbol; multiplexing the modulation symbols to the multiple antennas; spreading the modulation symbols to be transmitted on a first antenna of the multiple antennas with the spreading sequence; spreading the modulation symbols to be transmitted on a second antenna of the multiple antennas with the spreading sequence; and transmitting the spread modulation symbols on the antennas to which they were multiplexed.

In an alternative embodiment, a diversity transmission method for transmitting a variable orthogonality low code rate spatially multiplexed channel on multiple antennas is provided. The method includes receiving an indication of a plurality of spreading sequences; encoding a block of information bits to form channel coded bits, wherein the ratio of the number of channel coded bits to the number of information bits is greater than one; mapping the channel coded bits to modulation symbols, wherein each channel coded bit is mapped once to a modulation symbol; multiplexing the modulation symbols to the multiple antennas; spreading the modulation symbols to be transmitted on a first antenna of the multiple antennas with one of the indicated spreading sequences; spreading the modulation symbols to be transmitted on a second antenna of the multiple antennas with a second one of the indicated spreading sequences, wherein the second one of the spreading sequences may be the same as the first spreading sequence; and transmitting the spread modulation symbols on the antennas to which they were multiplexed.

In an alternative embodiment, a system for transmitting a low code rate spatially multiplexed channel on multiple antennas in a multi-antenna transmission mode is provided. The system includes a processor and a transmitter. The processor is configured such that the processor encodes a block of information bits to form channel coded bits, wherein the ratio of the number of channel coded bits to the number of information bits is greater than one; and the processor maps the channel coded bits to modulation symbols, and each channel coded bit is mapped once to a modulation symbol. The transmitter is configured to transmit a first portion of the modulation symbols using a spreading sequence on a first antenna of the multiple antennas and to transmit a second portion of the modulation symbols using the spreading sequence on a second antenna of the multiple antennas.

In an alternative embodiment, a system for transmitting a low code rate spatially multiplexed channel on multiple antennas in a multi-antenna transmission mode is provided. The system includes a processor and a transmitter. The processor is configured such that the processor encodes a block of information bits to form channel coded bits, wherein the ratio of the number of channel coded bits to the number of information bits is greater than one; and the processor maps the channel coded bits to modulation symbols, and each channel coded bit is mapped once to a modulation symbol. The transmitter is configured to transmit a first portion of the modulation symbols in a time-frequency resource on a first antenna of the multiple antennas and to transmit a second portion of the modulation symbols in the time-frequency resource on a second antenna of the multiple antennas.

In an alternative embodiment, a system for transmitting a variable orthogonality low code rate spatially multiplexed channel on multiple antennas is provided. The system includes a processor and a transmitter. The processor is configured such that, after receiving an indication of a plurality of spreading sequences, the processor encodes a block of information bits to form channel coded bits, wherein the ratio of the number of channel coded bits to the number of information bits is greater than one; and the processor maps the channel coded bits to modulation symbols, and each channel coded bit is mapped once to a modulation symbol; and the processor spreads the modulation symbols to be transmitted on a first antenna of the multiple antennas with a first one of the indicated spreading sequences; and the processor spreads the modulation symbols to be transmitted on a second antenna of the multiple antennas with a second one of the indicated spreading sequences, wherein the second one of the spreading sequences may be the same as the first spreading sequence. The transmitter is configured to transmit the spread modulation symbols on the antennas.

In an alternative embodiment, a system for transmitting a variable orthogonality low code rate spatially multiplexed channel on multiple antennas is provided. The system includes a processor and a transmitter. The processor is configured such that the processor encodes a block of information bits to form channel coded bits, wherein the ratio R2 of the number of channel coded bits to the number of information bits is greater than one; and the processor maps the channel coded bits to modulation symbols, and each channel coded bit is mapped once to a modulation symbol. The transmitter is configured to transmit a first portion of the modulation symbols using a first spreading sequence on a first antenna of the multiple antennas, transmit a second portion of the modulation symbols using the first spreading sequence on a second antenna of the multiple antennas, and transmit a third portion of the modulation symbols using a second spreading sequence on the first antenna of the multiple antennas.

In an alternative embodiment, a diversity transmission method for transmitting a virtualized variable orthogonality low code rate spatially multiplexed channel on multiple antennas is provided. The method includes receiving an indication of a plurality of spreading sequences; encoding a block of information bits to form channel coded bits, wherein the ratio R2 of the number of channel coded bits to the number of information bits is greater than one; mapping the channel coded bits to modulation symbols, wherein each channel coded bit is mapped once to a modulation symbol; repeating a portion of the modulation symbols to form repeated modulation symbols; transmitting a first reference signal and the modulation symbols on the first antenna; transmitting a second reference signal and the modulation symbols on the second antenna; applying a transformation to the repeated modulation symbols to form transformed repeated symbols; applying the transformation to the first reference signal to form a transformed reference signal; and transmitting the transformed repeated symbols and the transformed reference signal on a selected antenna of the multiple antennas.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A diversity transmission method for transmitting a low code rate spatially multiplexed channel on multiple antennas, comprising:

receiving an indication of a spreading sequence;

encoding a block of information bits to form channel coded bits, wherein the ratio R2 of the number of channel coded bits to the number of information bits is greater than one;

mapping the channel coded bits to modulation symbols, wherein each channel coded bit is mapped once to a modulation symbol;

multiplexing the modulation symbols to the multiple antennas;

spreading the modulation symbols to be transmitted on a first antenna of the multiple antennas with the spreading sequence;

spreading the modulation symbols to be transmitted on a second antenna of the multiple antennas with the spreading sequence; and transmitting the spread modulation symbols on the antennas to which they were multiplexed, wherein a single antenna transmission mode is additionally supported, comprising: transmitting on one antenna in the single antenna transmission mode of operation producing a second set of channel coded bits, wherein a second number of information bits in the single antenna transmission mode is the same as the number of information bits, and a third number of channel coded bits is produced, and the ratio of the third number of channel coded bits to the number of information bits is R1, and the ratio of R2 to R1 is greater than one, and all of the third set of channel coded bits are the same as a portion of the channel coded bits.

2. The method of claim 1, wherein the number of information bits is always less than or equal to a second number of channel coded bits, and the second number of channel coded bits is a number of bits mapped to the modulation symbols multiplexed to an antenna of the multiple antennas.

3. The method of claim 1, wherein the block of information bits does not contain error detection bits derived from the information bits.

4. The method of claim 3, wherein the block of information bits does not contain cyclic redundancy check bits.

5. The method of claim 1, wherein the step of encoding a block of information bits further comprises encoding the information bits using an extended channel code derived from a base channel code, wherein a portion of the channel coded bits is generated by:

encoding the information bits using the base channel code to form base channel coded bits;

repeating a portion of the base channel coded bits generated using the base channel code to form repeated channel coded bits; and multiplying the repeated channel coded bits by a sequence to form the portion of the channel coded bits.

6. The method of claim 1, wherein the step of encoding a block of information bits further comprises encoding the information bits using an extended block code derived from a base block code, wherein a portion of the channel coded bits is generated by encoding the information bits with an extended portion of the base block code, wherein the base block code comprises a matrix with K rows, and wherein the extended portion of the base block code comprises a matrix with L rows and a first submatrix with L rows and M columns and a second submatrix with L rows and N columns such that M+N is equal to the number of columns of the base block code, and wherein M is greater than or equal to $\log_2(K)$, and wherein the rank of the first submatrix is less than the minimum of L and M.

7. A diversity transmission method for transmitting a low code rate spatially multiplexed channel on multiple antennas, comprising:

receiving an indication of a spreading sequence;

encoding a block of information bits to form channel coded bits, wherein the ratio R2 of the number of channel coded bits to the number of information bits is greater than one;

mapping the channel coded bits to modulation symbols, wherein each channel coded bit is mapped once to a modulation symbol;

multiplexing the modulation symbols to the multiple antennas;

spreading the modulation symbols to be transmitted on a first antenna of the multiple antennas with the spreading sequence;

spreading the modulation symbols to be transmitted on a second antenna of the multiple antennas with the spreading sequence; and transmitting the spread modulation symbols on the antennas to which they were multiplexed, wherein the step of encoding a block of information bits further comprises encoding the information bits using an extended block code derived from a base block code, wherein a portion of the channel coded bits is generated by encoding the information bits with an extended portion of the base block code, wherein the base block code comprises a matrix with K rows, and wherein the extended portion of the base block code comprises a matrix with L rows and a first submatrix with L rows and M columns and a second submatrix with L rows and N columns such that M+N is equal to the number of columns of the base block code, and wherein M is greater than or equal to $\log_2(K)$, and wherein the rank of the first submatrix is less than the minimum of L and M.

8. The method of claim 7, wherein the number of information bits is always less than or equal to a second number of channel coded bits, and the second number of channel coded bits is a number of bits mapped to the modulation symbols multiplexed to an antenna of the multiple antennas.

9. The method of claim 7, wherein the block of information bits does not contain error detection bits derived from the information bits.

10. The method of claim 9, wherein the block of information bits does not contain cyclic redundancy check bits.

11. The method of claim 7, wherein a single antenna transmission mode is additionally supported, comprising:

transmitting on one antenna in the single antenna transmission mode of operation producing a second set of channel coded bits, wherein a second number of information bits in the single antenna transmission mode is the same as the number of information bits, and a third number of channel coded bits is produced, and the ratio of the third number of channel coded bits to the number of information bits is R1, and the ratio of R2 to R1 is greater than one, and all of the third set of channel coded bits are the same as a portion of the channel coded bits.

12. The method of claim 7, wherein the step of encoding a block of information bits further comprises encoding the information bits using an extended channel code derived from a base channel code, wherein a portion of the channel coded bits is generated by:
- encoding the information bits using the base channel code to form base channel coded bits;
- repeating a portion of the base channel coded bits generated using the base channel code to form repeated channel coded bits; and
- multiplying the repeated channel coded bits by a sequence to form the portion of the channel coded bits.

13. A diversity transmission method for transmitting a variable orthogonality low code rate spatially multiplexed channel on multiple antennas, comprising:
- receiving an indication of a plurality of spreading sequences;
- encoding a block of information bits to form channel coded bits, wherein the ratio R2 of the number of channel coded bits to the number of information bits is greater than one;
- mapping the channel coded bits to modulation symbols, wherein each channel coded bit is mapped once to a modulation symbol;
- multiplexing the modulation symbols to the multiple antennas;
- spreading the modulation symbols to be transmitted on a first antenna of the multiple antennas with one of the indicated spreading sequences;
- spreading the modulation symbols to be transmitted on a second antenna of the multiple antennas with a second one of the indicated spreading sequences, wherein the second one of the spreading sequences may be the same as the first spreading sequence; and
- transmitting the spread modulation symbols on the antennas to which they were multiplexed,
- wherein a plurality of channel quality indicator (CQI) reports are transmitted on a plurality of shared orthogonal resources, and wherein, when the transmission times of at least two of the CQI reports coincide, the CQI reports are transmitted on different orthogonal resources, and wherein, when the transmission times of at least two of the CQI reports do not coincide, a single CQI report is transmitted on a plurality of orthogonal resources.

14. The method of claim 13, wherein the number of information bits is always less than or equal to a second number of channel coded bits, and the second number of channel coded bits is a number of bits mapped to the modulation symbols multiplexed to an antenna of the multiple antennas.

15. The method of claim 13, wherein an equal number of symbols is multiplexed to each of the multiple antennas.

16. The method of claim 13, wherein the block of information bits does not contain error detection bits derived from the information bits.

17. A system for transmitting a low code rate spatially multiplexed channel on multiple antennas in a multi-antenna transmission mode, comprising:
- a processor configured such that the processor encodes a block of information bits to form channel coded bits, wherein the ratio R2 of the number of channel coded bits to the number of information bits is greater than one; and
- the processor maps the channel coded bits to modulation symbols, and each channel coded bit is mapped once to a modulation symbol; and
- a transmitter configured to transmit a first portion of the modulation symbols in a time-frequency resource on a first antenna of the multiple antennas and to transmit a second portion of the modulation symbols in the time-frequency resource on a second antenna of the multiple antennas,
- wherein a single antenna transmission mode is additionally supported, comprising the transmitter transmitting on one antenna in the single antenna transmission mode of operation producing a second set of channel coded bits, wherein a second number of information bits in the single antenna transmission mode is the same as the number of information bits, and a third number of channel coded bits is produced, and the ratio of the third number of channel coded bits to the number of information bits is R1, and the ratio of R2 to R1 is greater than one, and all of the second set of channel coded bits are the same as a portion of the channel coded bits.

18. The system of claim 17, wherein the number of information bits is always less than or equal to a second number of channel coded bits, and the second number of channel coded bits is a number of bits mapped to the modulation symbols transmitted on an antenna of the multiple antennas.

19. The system of claim 17 wherein the block of information bits does not contain error detection bits derived from the information bits.

20. The system of claim 17, wherein the processor multiplexes the modulation symbols to the multiple antennas to form the first and second portions of the modulation symbols, and wherein the number of symbols in the first and second portions are equal.

21. The system of claim 17, wherein the step of encoding a block of information bits further comprises encoding the information bits using an extended channel code derived from a base channel code, wherein a portion of the channel coded bits is generated by:
- encoding the information bits using the base channel code to form base channel coded bits;
- repeating a portion of the base channel coded bits generated using the base channel code and to form repeated channel coded bits; and
- multiplying the repeated channel coded bits by a sequence to form the portion of the channel coded bits.

22. The system of claim 17 wherein the system is a component of a user equipment configured to receive from an evolved node B at least one of:
- an indication of a spreading sequence; and
- an indication to the user equipment to transmit in one of the single antenna transmission mode and the multi-antenna transmission mode.

23. The system of claim 17, wherein the step of encoding a block of information bits further comprises encoding the information bits using an extended block code derived from a base block code, wherein a portion of the channel coded bits is generated by encoding the information bits with an extended portion of the base block code, wherein the base block code comprises a matrix with K rows, and wherein the extended portion of the base block code comprises a matrix with L rows and a first submatrix with L rows and M columns and a second submatrix with L rows and N columns such that M+N is equal to the number of columns of the base block code, and wherein M is greater than or equal to $\log_2(K)$, and wherein the rank of the first submatrix is less than the minimum of L and M.

24. A system for transmitting a low code rate spatially multiplexed channel on multiple antennas in a multi-antenna transmission mode, comprising:
- a processor configured such that the processor encodes a block of information bits to form channel coded bits, wherein the ratio R2 of the number of channel coded bits to the number of information bits is greater than one; and the processor maps the channel coded bits to modulation symbols, and each channel coded bit is mapped once to a modulation symbol; and a transmitter configured to transmit a first portion of the modulation symbols in a time-frequency resource on a first antenna of the multiple antennas and to transmit a second portion of the modulation symbols in the time-frequency resource on a second antenna of the multiple antennas, wherein the step of encoding a block of information bits further comprises encoding the information bits using an extended block code derived from a base block code, wherein a portion of the channel coded bits is generated by encoding the information bits with an extended portion of the base block code, wherein the base block code comprises a matrix with K rows, and wherein the extended portion of the base block code comprises a matrix with L rows and a first submatrix with L rows and M columns and a second submatrix with L rows and N columns such that M+N is equal to the number of columns of the base block code, and wherein M is greater than or equal to $\log_2(K)$, and wherein the rank of the first submatrix is less than the minimum of L and M.

25. The system of claim 24, wherein the number of information bits is always less than or equal to a second number of channel coded bits, and the second number of channel coded bits is a number of bits mapped to the modulation symbols transmitted on an antenna of the multiple antennas.

26. The system of claim 24, wherein the block of information bits does not contain error detection bits derived from the information bits.

27. The system of claim 24, wherein the processor multiplexes the modulation symbols to the multiple antennas to form the first and second portions of the modulation symbols, and wherein the number of symbols in the first and second portions are equal.

28. The system of claim 24, wherein a single antenna transmission mode is additionally supported, comprising the transmitter transmitting on one antenna in the single antenna transmission mode of operation producing a second set of channel coded bits, wherein a second number of information bits in the single antenna transmission mode is the same as the number of information bits, and a third number of channel coded bits is produced, and the ratio of the third number of channel coded bits to the number of information bits is R1, and the ratio of R2 to R1 is greater than one, and all of the second set of channel coded bits are the same as a portion of the channel coded bits.

29. The system of claim 28, wherein the system is a component of a user equipment configured to receive from an evolved node B at least one of:
an indication of a spreading sequence; and
an indication to the user equipment to transmit in one of the single antenna transmission mode and the multi-antenna transmission mode.

30. The system of claim 24, wherein the step of encoding a block of information bits further comprises encoding the information bits using an extended channel code derived from a base channel code, wherein a portion of the channel coded bits is generated by:
encoding the information bits using the base channel code to form base channel coded bits;
repeating a portion of the base channel coded bits generated using the base channel code and to form repeated channel coded bits; and
multiplying the repeated channel coded bits by a sequence to form the portion of the channel coded bits.

* * * * *